United States Patent
Gau et al.

(10) Patent No.: US 9,505,278 B1
(45) Date of Patent: Nov. 29, 2016

(54) AIR MAINTENANCE PUMP

(71) Applicant: THE GOODYEAR TIRE & RUBBER COMPANY, Akron, OH (US)

(72) Inventors: Jin-Shy Steve Gau, Hudson, OH (US); Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 11 days.

(21) Appl. No.: 14/825,500

(22) Filed: Aug. 13, 2015

(51) Int. Cl.
*B60C 23/12* (2006.01)
*B60C 23/00* (2006.01)

(52) U.S. Cl.
CPC ............ *B60C 23/12* (2013.01); *B60C 23/004* (2013.01)

(58) Field of Classification Search
CPC .................... B60C 23/12; B60C 23/004
USPC ........ 152/415, 416, 417, 418, 419; 417/211, 417/231, 233
See application file for complete search history.

(56) References Cited

U.S. PATENT DOCUMENTS

| | | | |
|---|---|---|---|
| 1,057,846 A | 4/1913 | Kanter | |
| 1,128,455 A | 2/1915 | Keith | |
| 1,254,903 A | 1/1918 | Hall | |
| 1,611,710 A * | 12/1926 | Ayers | B60C 23/12 152/420 |
| 1,744,405 A | 1/1930 | McCord | |
| 2,211,935 A | 8/1940 | Parker | |
| 2,415,618 A | 2/1947 | West | |
| 3,452,801 A | 7/1969 | Fletcher | |
| 4,061,200 A | 12/1977 | Thompson | |
| 4,269,252 A | 5/1981 | Shapiro | |
| 5,591,281 A * | 1/1997 | Loewe | B60C 23/12 152/418 |
| 5,975,174 A * | 11/1999 | Loewe | B60C 23/12 152/415 |
| 8,435,012 B2 * | 5/2013 | Clinciu | F04B 35/01 152/418 |
| 8,955,566 B2 | 2/2015 | Loewe | |

\* cited by examiner

*Primary Examiner* — S. Joseph Morano
*Assistant Examiner* — Jean Charleston
(74) *Attorney, Agent, or Firm* — Robert N. Lipcsik

(57) ABSTRACT

An air maintenance tire assembly includes a tire having a tire cavity bounded by first and second sidewalls extending to a tire tread region and air pumping means for generating pressurized air for maintaining air pressure within the tire cavity at a preset pressure level. The air pumping means includes an upper mounting plate fixed to a vehicle rim, a lower mounting plate fixed to the rim and diametrically opposed to the upper mounting plate, a dynamic mass pivotally attached to the upper mounting plate at a first end of the dynamic mass, and a pump fixed to the lower mounting plate and pivotally attached to a second end of the dynamic mass.

10 Claims, 1 Drawing Sheet

AIR MAINTENANCE PUMP

FIELD OF THE INVENTION

The present invention relates generally to vehicle tire pressure maintenance, and more specifically, to a tire pressure maintenance device contained on a wheel of a vehicle that automatically regulates and maintains a desired tire inflation pressure or amount of air in a tire.

BACKGROUND OF THE PRESENT INVENTION

Under-inflation of vehicle tires is dangerous, deadly, and common. Under-inflation is involved in many accidents, injuries, and fatalities annually. A device that automatically maintains proper tire inflation may eliminate most accidents, injuries, and fatalities due to under-inflation. In addition, an effective tire pressure maintenance device may improve fuel efficiency and reduce tire tread wear.

SUMMARY OF THE INVENTION

An air maintenance tire assembly in accordance with the present invention includes a tire having a tire cavity bounded by first and second sidewalls extending to a tire tread region and air pumping means for generating pressurized air for maintaining air pressure within the tire cavity at a preset pressure level. The air pumping means includes an upper mounting plate fixed to a vehicle rim, a lower mounting plate fixed to the rim and diametrically opposed to the upper mounting plate, a dynamic mass pivotally attached to the upper mounting plate at a first end of the dynamic mass, and a pump fixed to the lower mounting plate and pivotally attached to a second end of the dynamic mass.

According to another aspect of the air maintenance assembly, the dynamic mass is a 180° arcuate pivot arm.

According to still another aspect of the air maintenance assembly, the first end of the dynamic mass is pivotally attached to the upper mounting plate by a first hinge.

According to yet another aspect of the air maintenance assembly, the second end of the dynamic mass is pivotally attached to the lower mounting plate by a second hinge.

According to still another aspect of the air maintenance assembly, the air pumping means includes a piston attached to the second end of the dynamic mass and a cylinder corresponding to linear motion of the piston.

According to yet another aspect of the air maintenance assembly, as the vehicle rim rotates, the weight of the dynamic mass causes the dynamic mass to rotate about a first hinge at the first end of the dynamic mass thereby imparting reciprocating linear motion to the air pumping means.

According to still another aspect of the air maintenance assembly, a constraint cable is located between the first end of the dynamic mass and the second end of the dynamic mass.

According to yet another aspect of the air maintenance assembly, the dynamic mass is a 180° arcuate pivot arm and a constraint cable at a 90° location of the pivot arm limits rotational motion between the pivot arm and the upper mounting plate.

According to still another aspect of the air maintenance assembly, the air pumping device uses rotation of the vehicle rim to create an air pressure for transmission to the tire cavity.

According to yet another aspect of the air maintenance assembly, a constraint between the first end of the dynamic mass and the second end of the dynamic mass limits pivoting between the dynamic mass and the upper mounting plate.

A method in accordance with the present invention pressurizes a tire cavity of a pneumatic tire. The method includes the steps of: fixing an upper mounting plate to a first location on a vehicle rim; fixing a lower mounting plate to a second location on the vehicle rim, the second location being diametrically opposed to the first location; closing the tire cavity with the vehicle rim and first and second sidewalls extending from a bead region to a tire tread region of the pneumatic tire; pivoting a dynamic mass relative to the vehicle rim thereby generating pressurized air; and pumping the pressurized air to the tire cavity for maintaining pressure in the tire cavity at a preset pressure level.

According to another aspect of the method, the method includes the further step of forming the dynamic mass into a 180° arcuate pivot arm.

According to still another aspect of the method, the method includes the further step of attaching the first end of the dynamic mass to the upper mounting plate by a first hinge.

According to yet another aspect of the method, the method includes the further attaching the second end of the dynamic mass to the lower mounting plate by a second hinge.

According to still another aspect of the method, the method includes the further step of linearly moving a piston relative to a cylinder by the dynamic mass thereby generating pressurized air.

According to yet another aspect of the method, the method includes the further step of causing the dynamic mass to rotate relative to the vehicle rim.

According to still another aspect of the method, the method includes the further step of constraining the pivotal motion of the dynamic mass relative to the vehicle rim.

According to yet another aspect of the method, the method includes the further step of constraining the dynamic mass at a 90° location.

According to still another aspect of the method, the method includes the further step of creating the pressurized air by rotation of the vehicle rim and the pneumatic tire.

According to yet another aspect of the method, the method includes the further step of limiting pivoting motion between the dynamic mass and the upper mounting plate.

BRIEF DESCRIPTION OF THE DRAWINGS

These and other features and advantages of the examples disclosed herein will be better understood with respect to the following description and drawings, in which like numbers refer to like parts throughout, and in which.

DETAILED DESCRIPTION OF EXAMPLES OF THE PRESENT INVENTION

Figure 1:
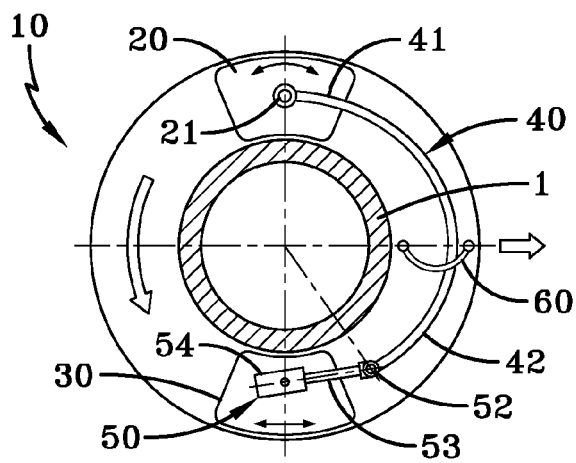
FIG. 1 schematically shows a system in accordance with the present invention under a first condition.

Referring now to the drawings which are for purposes of illustrating various examples of the present invention and not for purposes of limiting the same. An air pumping device in accordance with the present invention may be utilized with a tire rim and pneumatic tire. The pumping device may be affixed to the tire rim for the purpose of restoring air loss from an inflation volume of the pneumatic tire. The pumping device may include a dynamic mass mechanically confined to movement about a transmission mechanism and a pumping chamber.

The air pumping device may include one or more chambers and multiple valves. The chamber volume may be altered by the mechanical motion of the dynamic mass. One or more biasing elements, such as springs, may be incorporated to return the chamber volume from a high volume to a low volume, or vice versa. The valves may be configured to allow the chamber to intake air from the exterior of the inflation space and to exhaust the inspired air to the interior of the inflation space (e.g., a tire cavity). The valves may be selfchecking, or may be mechanically opened and closed under the influence of an auxiliary mechanism (e.g., electrical, pneumatic, hydraulic, etc.). A pressure regulating element may be included for the purpose of limiting the ability of the air pumping device to elevate the pressure of the inflation space beyond a preferred level. Upon sensing a target pressure, or as the target pressure is approached, the regulating element may suddenly or progressively disable the air pumping device by locking, releasing, closing, opening, etc. any number of functional elements such as ports, valves, mechanical linkages, etc.

The transmission device may allow various interaction modes between the dynamic mass and the air pumping device. One such transmission device may result in the mechanical integration of numerous movement reversals of the dynamic mass to affect a single intake and exhaust cycle, thereby allowing a wide degree of shock magnitudes to be captured, stored, and/or periodically released to drive operation of the air pumping device. Another transmission device may allow a variable mechanical advantage profile to exist over a full range of movement of the dynamic mass, thereby allowing work energy from the dynamic mass to be balanced with the variable energy requirement of the air pumping device. Still another transmission device, particularly one in which a biasing element is present in the air pumping device, may utilize the work energy of the dynamic mass to affect the exhaust of air from the air pumping device or, alternatively, the intake of air into the air pumping device.

The pumping device may be electro-mechanical, harvesting of mechanical energy from the movement of the dynamic mass and converting it to stored electrical energy in a capacitive device, utilizing an electro-mechanical device, then releasing that electrical energy by the same or a different electro-mechanical device to affect the pumping operation.

The air pumping device may be mounted to the tire rim in several ways. First, the air pumping device may utilize existing rim features and eliminate the need to modify the rim in any way. For example, the air pumping device may utilize the inflation valve access hole in the tire rim wall to provide both a fastening point and an ambient air intake port. Such a mounting may integrate the inflation valve function into its structure, or interface with an industry standard inflation valve. Second, the device may be configured to be mounted at any position on the tire rim and within the inflation space or tire cavity, generally, thereby not requiring modification of the tire rim to structurally ground the air pumping device to the tire rim and providing an access port for the intake of ambient air. The air pumping device in accordance with the present invention may lead to lower operating costs for vehicle owners and provide tire manufacturers additional options for achieving government mandated performance measures.

As shown in FIGS. 1-4, an air pumping device 10 in accordance with the present invention may include an upper mounting plate 20 fixed to a vehicle rim 1, a lower mounting plate 30 fixed to the rim and diametrically opposed to the upper mounting plate, a dynamic mass, or arcuate pivot arm 40, pivotally attached to the upper mounting plate at a first end 41 of the pivot arm by a first hinge 21, and a pump 50 fixed to the lower mounting plate and pivotally attached to a second end 42 of the pivot arm.

Figure 2:
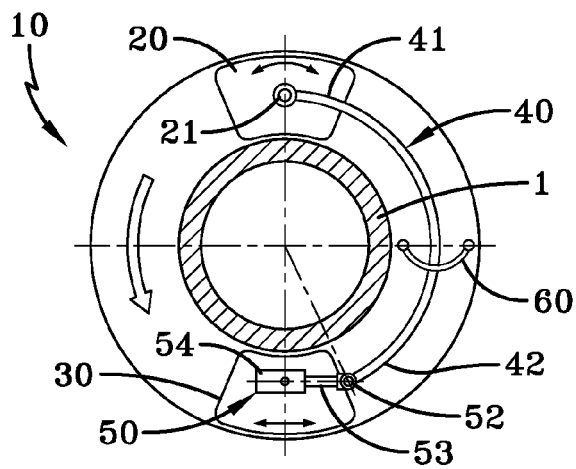
FIG. 2 schematically shows a system in accordance with the present invention under a second condition.
Figure 3:
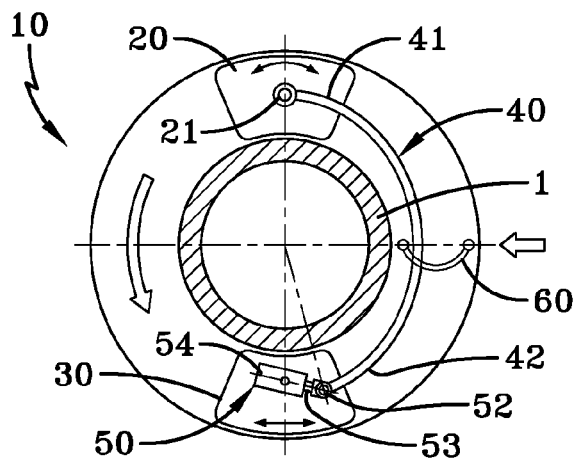
FIG. 3 schematically shows a system in accordance with the present invention under a third condition.
Figure 4:
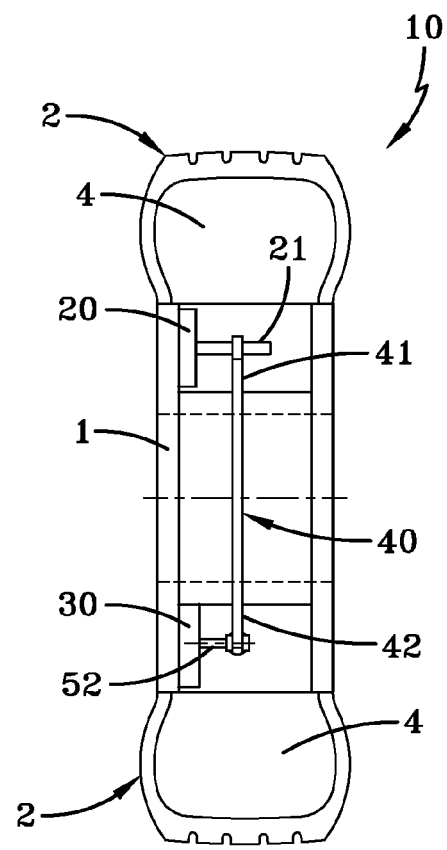
FIG. 4 schematically shows a sectional view of the system of FIGS. 1-3.

The pivot arm 40 may extend circumferentially 180° around the rotation axis of the rim 1 from the first hinge 21 to a second hinge 52 of the pump 50. The pump 50 may include a piston 53 attached to the second hinge 52 and a cylinder 54 corresponding to linear motion of the piston. As the rim 1 rotates, the weight of the pivot arm 40 may cause the pivot arm to rotate about the first hinge 21 and thereby imparting reciprocating linear motion to the piston 53 within the cylinder 54. The air pumping device 10 may thereby use rotation of the rim 1 to create an air pressure for transmission to a tire cavity 4 of a tire 2. A constraint cable 60, or other limiting device, may be places about the pivot arm 40 at any point between the first hinge 21 and the second hinge 52, for example, midway between the first hinge and the second hinge (FIGS. 1-3).

The above description is given by way of example, and not limitation. Given the above disclosure, one skilled in the art could devise variations that are within the scope and spirit of the present invention disclosed herein, including various ways of utilizing or modifying examples of the present invention. Further, the various features of the examples disclosed herein may be used alone, or in varying combinations, with each other and are not intended to be limited to the specific combination described herein. Thus, the scope of the claims is not to be limited by the illustrated examples. Other modifications may be variously implemented utilizing the teachings found herein.

What is claimed:
1. An air maintenance tire assembly comprising:
 a tire having a tire cavity bounded by first and second sidewalls extending to a tire tread region; and
 air pumping means for generating pressurized air for maintaining air pressure within the tire cavity at a preset pressure level, the air pumping means including an upper mounting plate fixed to a vehicle rim, a lower mounting plate fixed to the rim and diametrically opposed to the upper mounting plate, a dynamic mass pivotally attached to the upper mounting plate at a first end of the dynamic mass, and a pump fixed to the lower mounting plate and pivotally attached to a second end of the dynamic mass.

2. The air maintenance tire assembly as set forth in claim 1 wherein the dynamic mass is a 180° arcuate pivot arm.

3. The air maintenance tire assembly as set forth in claim 1 wherein the first end of the dynamic mass is pivotally attached to the upper mounting plate by a first hinge.

4. The air maintenance tire assembly as set forth in claim 3 wherein the second end of the dynamic mass is pivotally attached to the to the lower mounting plate by a second hinge.

5. The air maintenance tire assembly as set forth in claim 1 wherein the air pumping means includes a piston attached to the second end of the dynamic mass and a cylinder corresponding to linear motion of the piston.

6. The air maintenance tire assembly as set forth in claim 1 wherein, as the vehicle rim rotates, the weight of the dynamic mass causes the dynamic mass to rotate about a first hinge at the first end of the dynamic mass thereby imparting reciprocating linear motion to the air pumping means.

7. The air maintenance tire assembly as set forth in claim 1 further including a constraint cable between the first end of the dynamic mass and the second end of the dynamic mass.

8. The air maintenance tire assembly as set forth in claim 1 wherein the dynamic mass is a 180° arcuate pivot arm and a constraint cable at a 90° location of the pivot arm limits rotational motion between the pivot arm and the upper mounting plate.

9. The air maintenance tire assembly as set forth in claim 1 wherein the air pumping device uses rotation of the vehicle rim to create an air pressure for transmission to the tire cavity.

10. The air maintenance tire assembly as set forth in claim 1 further including a constraint between the first end of the dynamic mass and the second end of the dynamic mass for limiting pivoting between the dynamic mass and the upper mounting plate.

\* \* \* \* \*